Dec. 27, 1960 W. KASTEN 2,965,933
METHOD OF MOLDING ENDCAPS ON FILTER ELEMENTS
Original Filed Dec. 6, 1956 2 Sheets-Sheet 1

INVENTOR.
WALTER KASTEN
BY
William N. Antonis
ATTORNEY

Dec. 27, 1960 W. KASTEN 2,965,933
METHOD OF MOLDING ENDCAPS ON FILTER ELEMENTS
Original Filed Dec. 6, 1956 2 Sheets-Sheet 2

INVENTOR.
WALTER KASTEN
BY
William N. Antonis
ATTORNEY

United States Patent Office 2,965,933
Patented Dec. 27, 1960

2,965,933

METHOD OF MOLDING ENDCAPS ON FILTER ELEMENTS

Walter Kasten, Royal Oak, Mich., assignor to The Bendix Corporation, a corporation of Delaware Original application Dec. 6, 1956, Ser. No. 626,651. Divided and this application Dec. 30, 1957, Ser. No. 706,164

5 Claims. (Cl. 18—59)

This invention relates to filters, and more particularly to a method of molding endcaps on pleated filter elements.

This application is a division of my copending application Serial No. 626,651, filed December 6, 1956, now U.S. Patent No. 2,919,765, issued January 5, 1960.

There has been a decided trend in the past year towards using pleated paper air filters for automotive use. The problem of properly sealing the pleated ends of the pleated paper element has been solved by molding plastic endcaps on each end in the manner described in Patent No. 2,771,156 (Kasten et al.). In order to protect the exposed portions of the pleated element and to give added rigidity thereto, screen type wrappers have often been placed around the pleated element and have been embedded in the plastic endcaps along with the pleated ends of the element. It has been found that by using a perforated metal wrapper instead of a screen, that greater rigidity is provided and that the pleated paper element is less likely to be injured since less area of the paper is exposed. Furthermore, the perforated metal wrapper has the added advantage of being cheaper to manufacture than a comparable screen wrapper. One drawback, however, to using regular perforated metal as a wrapper, is that any inward bending of the metal will often cut into and ruin the filter, since the edges of the perforations are relatively sharp. In order to obviate this disadvantage, without added expense, I have provided extruded perforations in the wrapper which have their edges spaced from its outer face. As a result of using such a wrapper, injury to the pleated paper, due to any bending inwardly of the metal, is eliminated, since only rounded edges will contact the paper. Furthermore such embossing tends to increase the rigidity of the metal wrapper even further.

In order to facilitate production of the filter assembly and to improve the seal obtained through use of a plastic endcap, spacing means are provided on the end of the perforated metal wrapper which align the pleated paper member with respect to the wrapper and prevent the member from touching the bottom of the mold during the molding operation.

One of the objects of this invention, therefore, is to provide a method of molding a resilient plastic endcap to a pleated filter element having a perforated wrapper therearound, wherein both the element and wrapper are embedded in the endcap.

Another object of this invention is to provide a method of molding a plastic endcap on the end of a pleated member whereby the end of the member will be spaced a predetermined distance from the outer face of the endcap, thereby improving the endcap seal.

A further object of this invention is to provide a method of molding a resilient plastic endcap to a pleated filter element having a perforated wrapper therearound, wherein spacing means formed on the end of the wrapper are utilized to space the end of the pleated filter a predetermined distance from the bottom of the mold.

Other objects and advantages will become apparent from the following description and accompanying drawings, wherein.

Figure 4:
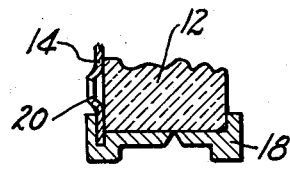
Figure 4 shows in section a portion of a pleated filter element and a metal wrapper embedded in a plastic endcap.
Figure 3:
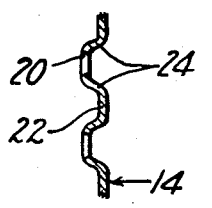
Figure 3 shows in section another configuration of a wrapper having extruded perforations.
Figure 2:
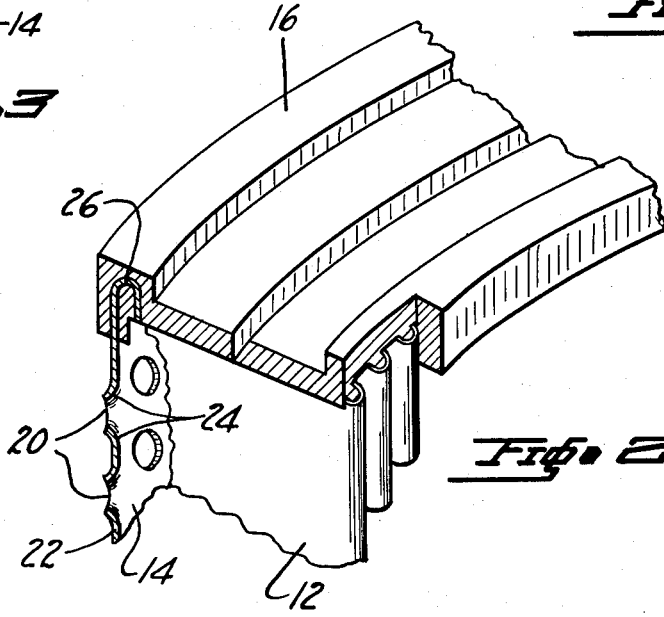
Figure 2 is an enlarged sectional view in perspective of a portion of the filter element with portions of the endcap broken away for clarity.

Referring to the drawings, numeral 10 designates a filter element comprising a pleated paper portion 12, or other porous or permeable membrane material, a perforated embossed metal wrapper 14, and plastic endcaps 16 and 18 which are molded about the ends of the pleated member 12 and the wrapper 14. The metal wrapper 14 has a multiplicity of perforations which in accordance with my invention have their edges 20 spaced from the outer face 22 of the wrapper. These protuberant areas which bulge beyond the surrounding or adjacent surface give added rigidity to the wrapper 14 and prevent the cutting of the filter paper by the sharp edges 20 of the perforations. Thus, if the metal wrapper is bent inwardly, any likelihood of cutting the filter paper is eliminated, since only rounded edges 24 would contact the pleated paper. A similar result can be achieved by turning the edges 20 of the extruded perforations inwardly, as shown in Figure 3, thereby achieving the added benefit of having a smoother outer surface. The ends of the wrapper 14 are turned inwardly at 26 in order to easily position the pleated filter member with respect to the wrapper. It is possible, however, to eliminate the inwardly turned portion 26 of the metal wrapper 14 as shown in Figure 4, by providing an interference between the diameter of the wrapper and the outer diameter of the pleated element 12. In this manner proper alignment between the two members can also be adequately maintained.

Figure 1:
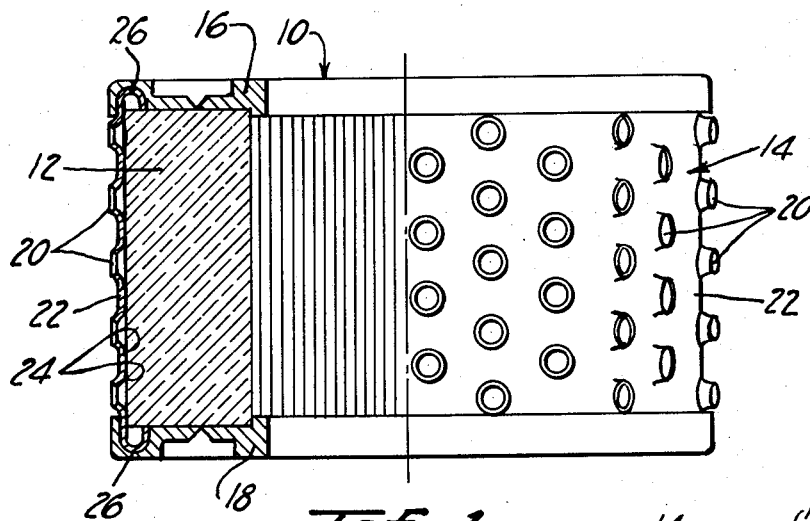
Figure 1 is a side elevation, partially in section, of a pleated filter incorporating my invention.
Figure 5:
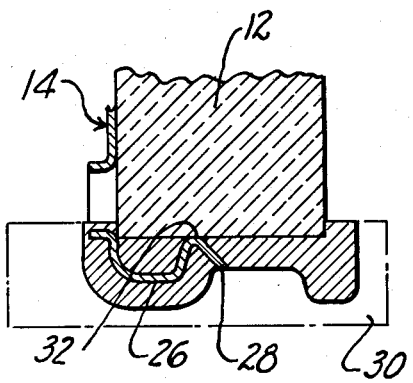
Figure 5 shows an enlarged sectional view of a portion of a pleated member and a perforated wrapper positioned in a mold for forming plastic endcaps on the end thereof, with the section of the wrapper taken on line 5—5 of Figure 6.
Figure 6:
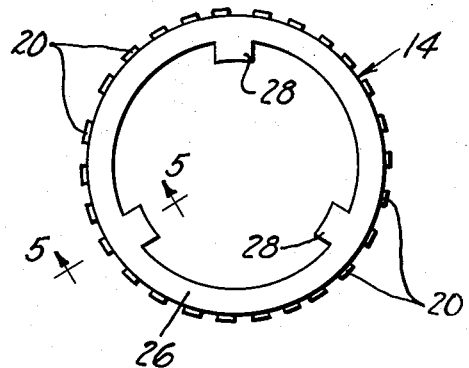
Figure 6 is an end view of the perforated wrapper shown in Figure 5.
Figure 7:
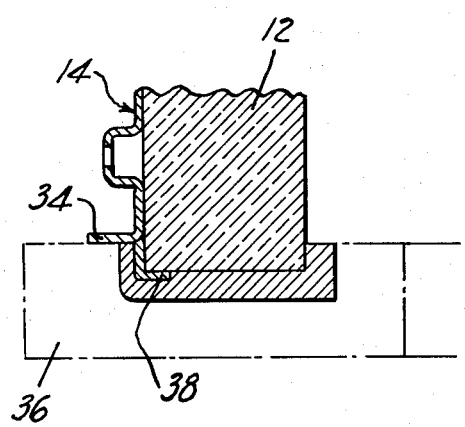
Figure 7 shows in section an alternate method of positioning a pleated member and a perforated wrapper in a mold, with the section of the wrapper taken on line 7—7 of Figure 8.
Figure 8:
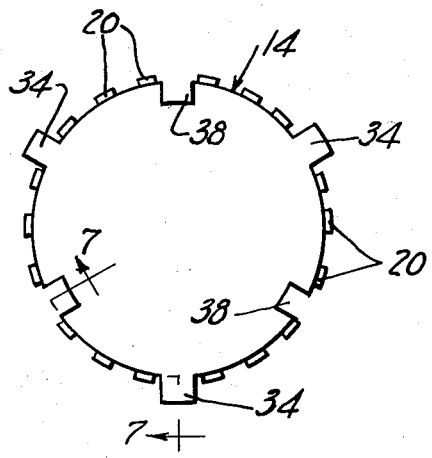
Figure 8 is an end view of the perforated wrapper shown in Figure 7.

Figures 1 and 4 show endcaps which have been molded in a mold having a ridge formed in the bottom thereof. The purpose of the ridge, as explained in Patent No. 2,771,156 (Kasten et al.) is to space the end of the pleated member 12 from the bottom of the mold so that the pleated member will have properly sealed ends. Figures 5 to 8 show means whereby the spacing member may be incorporated in the metal wrapper 14 so that the seal on the end of the pleated member may be improved. Figures 5 and 6 show a portion of the wrapper having inwardly turned ends 26 with three internal spacing prongs 28 formed thereon. The end of the wrapper is shaped so that the end of the prong 28 rests on the bottom of a mold 30 and the pleated member rests on a portion of the end 26 at a point 32. In this manner the end of the pleated member is spaced from the bottom of the mold and a plastic endcap of predetermined minimum uniform thickness is formed thereon. Figures 7 and 8 show an alternate method of positioning a pleated member and wrapper wherein the end of the wrapper is formed with three external prongs 34 for resting on a mold 36 and three internal prongs 38 which space the end of the pleated member a predetermined distance from the bottom of the mold. Here again the molding operation results in an endcap having a uniform minimum thickness. The internal and external prongs may easily be formed by bending certain portions on the end of the wrapper outwardly and other portions inwardly.

The actual molding operation consists of filling the molds to a predetermined level with a plastic composition known as a "Plastisol." Plastisols consist of (1) a vinyl resin, (2) fillers and/or pigments, (3) one or more plasticizers, and (4) stabilizers. After the mold has been filled with the plastic composition the end of the pleated member 12 and the wrapper 14, with spacing prongs thereon, are immersed in the mold. The plastic composition is then solidified by heating it up to 350–375° F. Upon the application of heat, the liquid fuses together to form a homogeneous uniform mass with the pleated member and wrapper embedded therein.

It can thus be seen that filter assemblies which include pleated paper members, plastic endcaps, and outer wrappers having extruded perforations and spacing prongs in accordance with my invention will have increased rigidity, improved filter protection, and improved endcap seals, since the prongs will eliminate mold spacing ridges or wires in the process of molding endcaps.

Having thus described the various features of my invention, what I claim as new and desire to secure by Letters Patent is:

1. A method of molding an endcap on a pleated filter member and spacing the end of said pleated filter member from the outer face of the molded endcap in which the pleated member is embedded, comprising the steps of wrapping a perforated sheet around the pleated member so that the sheet is adjacent the exposed outer pleated surface of said pleated member, said sheet having spacing means formed on the end to be embedded in said molded endcap, pouring a plastic composition into a mold, placing said pleated member and sheet into the mold so that the spacing means rests on said mold and the end of said pleated member rests on said spacing means a predetermined distance from the bottom of said mold, and curing said plastic composition until solid.

2. A method of molding an endcap on a pleated filter member and spacing the end of said pleated filter member from the outer face of the molded endcap in which the pleated member is embedded, comprising the steps of wrapping a perforated sheet around the pleated member so that the sheet is adjacent the exposed outer pleated surface of said pleated member, said sheet having inwardly extending spacing means formed on the end to be embedded in said molded endcap, pouring a plastic composition into a mold, placing said pleated member and sheet into the mold so that the spacing means rests on the bottom of the mold and the end of said pleated member rests on said spacing means a predetermined distance from the bottom of said mold, and curing said plastic composition until solid.

3. A method of molding an endcap on a pleated filter member and spacing the end of said pleated filter member from the outer face of the molded endcap in which the pleated member is embedded, comprising the steps of wrapping a perforated sheet around the pleated member so that the sheet is adjacent the exposed outer pleated surface of said pleated member, said sheet having inner and outer spacing means formed on the end to be embedded in said molded endcap, pouring a plastic composition into a mold, placing said pleated member and sheets into the mold so that the outer spacing means rests on an outer surface of said mold and the end of said pleated member rests on the inner spacing means a predetermined distance from the bottom of the mold, and curing said plastic composition until solid.

4. A method of molding an endcap on a pleated filter member and spacing the end of said pleated filter member from the outer face of the molded endcap in which the pleated member is embedded, comprising the steps of placing a wrapper around the pleated member so that the wrapper is adjacent the exposed outer pleated surface of said pleated member, said wrapper having inwardly extending prongs formed on the end to be embedded in said molded endcap, pouring a plastic composition into a mold, placing said pleated member and wrapper into the mold so that the prongs rest on the mold and the end of said pleated member rests on said prongs a predetermined distance from the bottom of said mold, and curing said plastic composition until solid.

5. A method of molding an endcap on a pleated filter member and spacing the end of said pleated filter member from the outer face of the molded endcap in which the pleated member is embedded, comprising the steps of placing a wrapper around the pleated member so that the wrapper is adjacent the exposed outer pleated surface of said pleated member, said wrapper having a plurality of inner and outer spacing prongs formed on the end to be embedded in said molded endcap, pouring a plastic composition into a mold, placing said pleated member and wrapper into the mold so that the outer prongs rest on said mold and the end of said pleated member rests on the inner prongs a predetermined distance from the bottom of the mold, and curing said plastic composition until solid.

References Cited in the file of this patent

UNITED STATES PATENTS

| | | |
|---|---|---|
| 2,732,031 | Rabbitt et al. | Jan. 24, 1956 |
| 2,736,583 | Marvin | Feb. 28, 1956 |
| 2,771,156 | Kasten et al. | Nov. 20, 1956 |